United States Patent Office 2,823,765
Patented Feb. 18, 1958

2,823,765

ADSORPTION OF GASES WITH A LIQUID-ADSORBENT SLURRY

Frank Maslan, Newton Highlands, Mass., assignor to Escambia Chemical Corporation, Pace, Fla., a corporation of Delaware No Drawing. Original application May 11, 1956, Serial No. 584,186. Divided and this application June 11, 1957, Serial No. 664,913

4 Claims. (Cl. 183—114.2)

This invention relates to the production of chemicals and in particular to the separation or recovery of chemicals from gaseous mixtures. This application is a division of copending application Serial No. 584,186, filed May 11, 1956.

A principal object of the present invention is to provide an improved adsorption process for the separation of chemicals from gaseous mixtures.

Another object of the invention is to provide a liquid adsorption system which has many additional advantages over the currently employed adsorption systems.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

Adsorption is usually carried out by passing a mixture of gases over an adsorbent such as charcoal. The adsorbent may either be a stationary bed or a moving one. The adsorbent will adsorb varying amounts of the gases present in the mixture depending on their characteristics. Basically adsorbents such as charcoal will adsorb high-molecular-weight, low-volatility compounds in preference to low-molecular-weight, high-volatility ones.

Adsorption, when used as a gaseous separation process, has some very definite advantages. First, it is possible to get a very high recovery efficiency. For example, better than 95 percent of the propane contained in a methane stream can be recovered without much difficulty. Concurrently, only 5 to 10 percent of the methane would be adsorbed. Second, the adsorption process is highly selective. This is illustrated by comparison of the percentages of propane and methane given in the previous example. This high degree of selectivity enables one to make a sharp separation. Third, comparatively low pressures are required in the adsorption process. These pressures are usually lower than for comparable solvent absorption processes. An adsorbent such as activated charcoal is capable of adsorbing as much as 25 percent of its weight of a material such as propane at pressures of 50 p. s. i. g. and less. Fourth, the adsorption process is usually carried out at room temperature. There is little need for refrigeration other than that obtained with cooling water. On the other hand, it is very common for refrigeration to be required in absorption processes in order to obtain a high enough solvent capacity.

Most of the disadvantages of adsorption separation processes lie in the handling requirements for the solid adsorbents. In the fixed-bed adsorber, over-all efficiency is low because all the adsorbent can not be utilized and because the process is inherently a batch operation. The moving-bed type adsorption process requires large-scale, expensive equipment and has a fairly high attrition loss of the adsorbent. This attrition problem is probably the chief drawback to using any kind of moving adsorbent bed. In this process, particles about ¼ inch diameter are usually used. As they move down the tower, they grind on each other, creating a certain amount of fines which have to be separated and discarded on recycle. Since adsorbents are quite expensive, these fines represent a significant percent of the operating cost. The fluidized-bed type adsorption has an even worse attrition problem. In this type of operation, the adsorbent has a usual mesh size of 100 to 200 and is fluidized with the gaseous mixture so that it flows countercurrent to the gas through a contacting device. As it does so, the adsorbent grinds on itself, producing a very high percent of attrition. For many gaseous separation processes, it is desirable to operate at elevated pressures. On the other hand, it is difficult to operate solid-gas contacting units at elevated pressures. This is primarily a problem of maintaining gas-tight seals in solids-handling equipment.

The adsorption processes, whether stationary bed or countercurrent-moving bed, are inherently adiabatic operations. Due to the heat of adsorption, fairly high temperatures occur where the adsorption is taking place. Since the amount of gas adsorbed is directly related to the temperature, any rise in temperature is undesirable. On the other hand, due to the poor heat transfer characteristics and expensive equipment, cooling by such means as cooling water in tubes is not usually resorted to in this equipment.

The present invention is primarily directed to a process for separating, recovering or purifying gaseous mixtures containing a gas or gases which can be adsorbed on an adsorbent by contacting the gaseous mixture with an adsorbent suspended in a liquid, the adsorbent and liquid being mutually incompatible. In one preferred embodiment of the invention, the liquid is water and the adsorbent suspended therein is charcoal, preferably activated charcoal. In another embodiment of the invention, a liquid-adsorbent slurry can be used for the separation of gases soluble in the liquid from gases which can be adsorbed on an adsorbent.

The present adsorption separation process has all the advantages of the adsorbent systems described above and yet eliminates most of the disadvantages found therein. Basically the present invention provides an improved adsorption medium which consists of an adsorbent suspended in a liquid so as to form a slurry. For example, fine-size activated charcoal can be suspended in water. Hydrodynamically this decreases almost completely the attrition of the particles on each other. This is due to the fact that the liquid, such as water, has a viscosity and surface tension so much higher than air that each particle of adsorbent is shielded from the other particles by a layer of liquid. This marked decrease in attrition eliminates the main economic reason for not using fluid-bed adsorption processes. Depending on the system of adsorbent and liquid, a wetting agent may be used in order to get better contact between the liquid and the adsorbent. This will depend upon the specific system employed.

The present adsorption process is operable if the gaseous mixture to be treated can diffuse through the liquid and if the liquid and adsorbent are mutually incompatible. This is true of charcoal and water. Charcoal will preferentially adsorb organic materials rather than water. On the other hand, such materials as activated alumina and silica gel are hydrophilic. In separating organic gases, the most useful system is activated carbon or charcoal suspended in water.

Not only is the attrition of the adsorbent decreased by using the liquid but a slurry is much easier to handle than a gas-solid mixture. The slurry is like a liquid and may be pumped. Since the slurry is like a liquid, it can be handled easily at elevated pressures. Equipment and seals ordinarily used for gas-liquid systems can easily be used for the gas-slurry systems discussed here. In a fluidized bed system, large quantities of gas are required for moving the fluidized adsorbent. This requirement is entirely eliminated by using the slurry. The liquid (water) will act as a coolant for the heat of adsorption. This means that the temperature of adsorption can be controlled to desirable lower temperatures. This can mean a large difference in the adsorption capacity of a material such as charcoal.

The rich adsorbent in the slurry may be regenerated by one of several means or combinations thereof. The ambient pressure may be decreased. This causes the adsorbate to come off of the adsorbent. The slurry may be boiled. This is a very convenient way of retaining the slurry and, at the same time, raising the temperature of the system so as to cause the adsorbed gas to come off. The rich adsorbent can be separated from the liquid and then heated to as high a temperature as is required for regeneration. The separated adsorbent may be washed with a solvent which removes the adsorbate, or the adsorbate may be displaced with another material which is more preferentially adsorbed. A combination of heating and decreasing of pressure is the most preferable regeneration technique.

The present adsorption process may be used, for example, in the extraction of ethane and propane from natural gas or refinery gas. This can be easily accomplished by contacting natural gas, for example, with a slurry of water and activated charcoal at room temperature and at a pressure of about 500 p. s. i. g. The ethane and propane are adsorbed by the suspended activated charcoal and recovered therefrom by, for example, decreasing the pressure to about 250 p. s. i. g. and heating so as to cause the adsorbates ethane and propane to come off of the charcoal adsorbent.

The present adsorption process may also be used in the recovery or purification of acetylene from "Sachsse" or "Wulff" type acetylene streams. Acetylene streams containing less than about 15 percent acetylene are now being commercially produced directly by methods such as the "Sachsse" or "Wulff" processes, which utilize hydrocarbons or mixtures thereof as the starting materials. The composition of a dilute acetylene stream obtained from the above processes depends, to a great extent, upon the hydrocarbon or hydrocarbons employed as the starting material. However, these streams generally contain various proportions of acetylene, carbon oxides, hydrogen, nitrogen and unsaturated and/or saturated hydrocarbons. The acetylene can be recovered from this stream by contacting it with a slurry of water and activated charcoal maintained, for example, at room temperature and at a pressure of about 50 p. s. i. g. Substantially all of the acetylene in the gas stream is adsorbed by the charcoal and can be recovered therefrom preferably by a combination of heating the acetylene-rich adsorbent at a somewhat lower pressure, e. g., 15 p. s. i. g.

In one preferred embodiment of the invention, water slurries containing 5 percent by weight or more of activated charcoal are preferable. The adsorptive powers of the slurry increase as the quantity of charcoal in the slurry increases.

The adsorption process of the present invention can also be used in the removal of nitrogen from natural gas, the recovery and purification of ethylene from hydrogen, the purification of vinyl chloride in the presence of acetylene, the purification of acrylonitrile in the presence of acetylene, the purification of hydrogen, the purification of synthesis gas, the removal of carbon dioxide, and the removal of hydrogen sulfide.

The slurry of water and charcoal can also be used as a combination adsorption-absorption system. With this system, it is possible to obtain a fractionation between two dissolved gases, one more soluble in water and one more soluble or capable of being adsorbed on the charcoal. After the absorption and adsorption, the water and the charcoal can be separated from each other by suitable filtration means and regenerated individually, thus giving a separation between the two gases. Systems which can be separated by this means are mixtures containing hydrogen cyanide and ammonia, hydrogen sulfide and carbon dioxide, and acrylonitrile and hydrogen cyanide.

Since certain changes may be made in the above process without departing from the scope of the invention herein involved, it is intended that all matter contained in the above description shall be interpreted as illustrative and not in a limiting sense.

What is claimed is:

1. A process for the separation of ethane and propane from a natural gas stream which comprises contacting said natural gas stream with a slurry of water and activated charcoal, and recovering the ethane and propane adsorbed on said charcoal.

2. A process for the separation of ethane and propane from a natural gas stream which comprises contacting said natural gas stream with a slurry of water and activated charcoal maintained at about room temperature and at a pressure of at least 500 p. s. i. g., and recovering the ethane and propane adsorbed by heating said charcoal while it is maintained at a pressure below 500 p. s. i.

3. A process for the separation of ethane and propane from a refinery gas stream which comprises contacting said refinery gas stream with a slurry of water and activated charcoal, and recovering the ethane and propane adsorbed on said charcoal.

4. A process for the separation of ethane and propane from a refinery gas stream which comprises contacting said refinery gas stream with a slurry of water and activated charcoal maintained at about room temperature and at a pressure of at least 500 p. s. i. g., and recovering the ethane and propane adsorbed by heating said charcoal while it is maintained at a pressure below 500 p. s. i.

References Cited in the file of this patent

UNITED STATES PATENTS

| 2,519,873 | Berg | Aug. 22, 1950 |
| 2,681,125 | Etherington | June 15, 1954 |
| 2,768,942 | Marple et al. | Oct. 30, 1956 |